United States Patent [19]

Pearce et al.

[11] Patent Number: 5,350,221
[45] Date of Patent: Sep. 27, 1994

[54] FIBER REINFORCED SPOKE FOR WHEELS OF BICYCLES, WHEELCHAIRS AND THE LIKE, AND METHOD OF MAKING SAME

[75] Inventors: Terry V. Pearce, Sandy; Tony M. Pearce, Alpine, both of Utah

[73] Assignee: Edo Sports Inc., Salt Lake City, Utah

[21] Appl. No.: 32,386

[22] Filed: Mar. 18, 1993

Related U.S. Application Data

[63] Continuation-in-part of Ser. No. 728,619, Jul. 11, 1991, abandoned.

[51] Int. Cl.$^5$ .............................................. B60B 1/02
[52] U.S. Cl. ................................. 301/104; 301/58; 301/64.7
[58] Field of Search ................. 301/55, 56, 57, 58, 301/59, 64.7, 67, 74, 104, 110.5

[56] References Cited

U.S. PATENT DOCUMENTS

| | | | |
|---|---|---|---|
| 4,483,214 | 11/1984 | Mayer | 301/64.7 X |
| 4,511,184 | 4/1985 | Schauf et al. | 301/64.7 |
| 4,729,605 | 3/1988 | Imao et al. | 301/104 |
| 4,793,659 | 12/1988 | Oleff et al. | 301/64.7 |
| 5,110,190 | 5/1992 | Johnson | 301/104 |

FOREIGN PATENT DOCUMENTS

| | | | |
|---|---|---|---|
| 1119698 | 12/1961 | Fed. Rep. of Germany | 301/58 |
| 2703753 | 8/1977 | Fed. Rep. of Germany | 301/104 |
| 3536308 | 4/1987 | Fed. Rep. of Germany | 301/104 |
| 2526374 | 11/1983 | France | 301/58 |
| 4-008601 | 1/1992 | Japan | 301/58 |
| 9113771 | 9/1991 | World Int. Prop. O. | 301/104 |

OTHER PUBLICATIONS

Single Page Document Showing 4 FIGS; Numbered 469068 (German?) Undated.

*Primary Examiner*—Russell D. Stormer
*Attorney, Agent, or Firm*—Thorpe, North & Western

[57] ABSTRACT

A spoke for wheels of bicycles, wheelchairs, and the like includes an injection molded discontinuous fiber reinforced plastic shaft formed to have an airfoil shape cross-section, to be oriented in the wheel so as to provide the least wind drag. The shaft is formed with an axially extending threaded first hollow at a first end and an axially extending second hollow at a second end. The spoke further includes an elongate hub element formed with a bend at one end and threads at the other end for screwing into the first hollow of the shaft, and an elongate bar for insertion and securing at one end into the second hollow of the shaft. Threads are formed at the other end of the bar for connecting to the rim of the wheel.

20 Claims, 3 Drawing Sheets

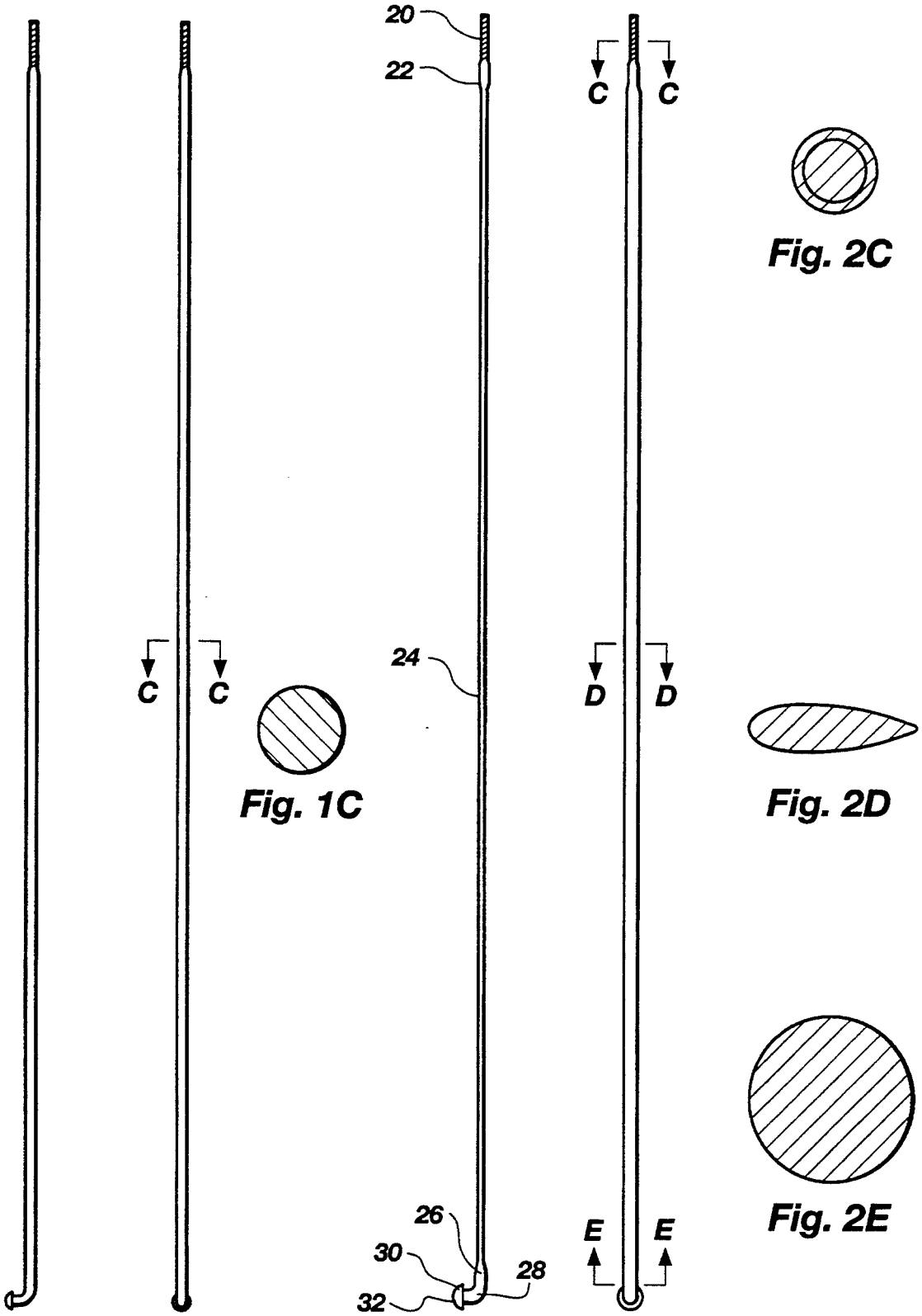

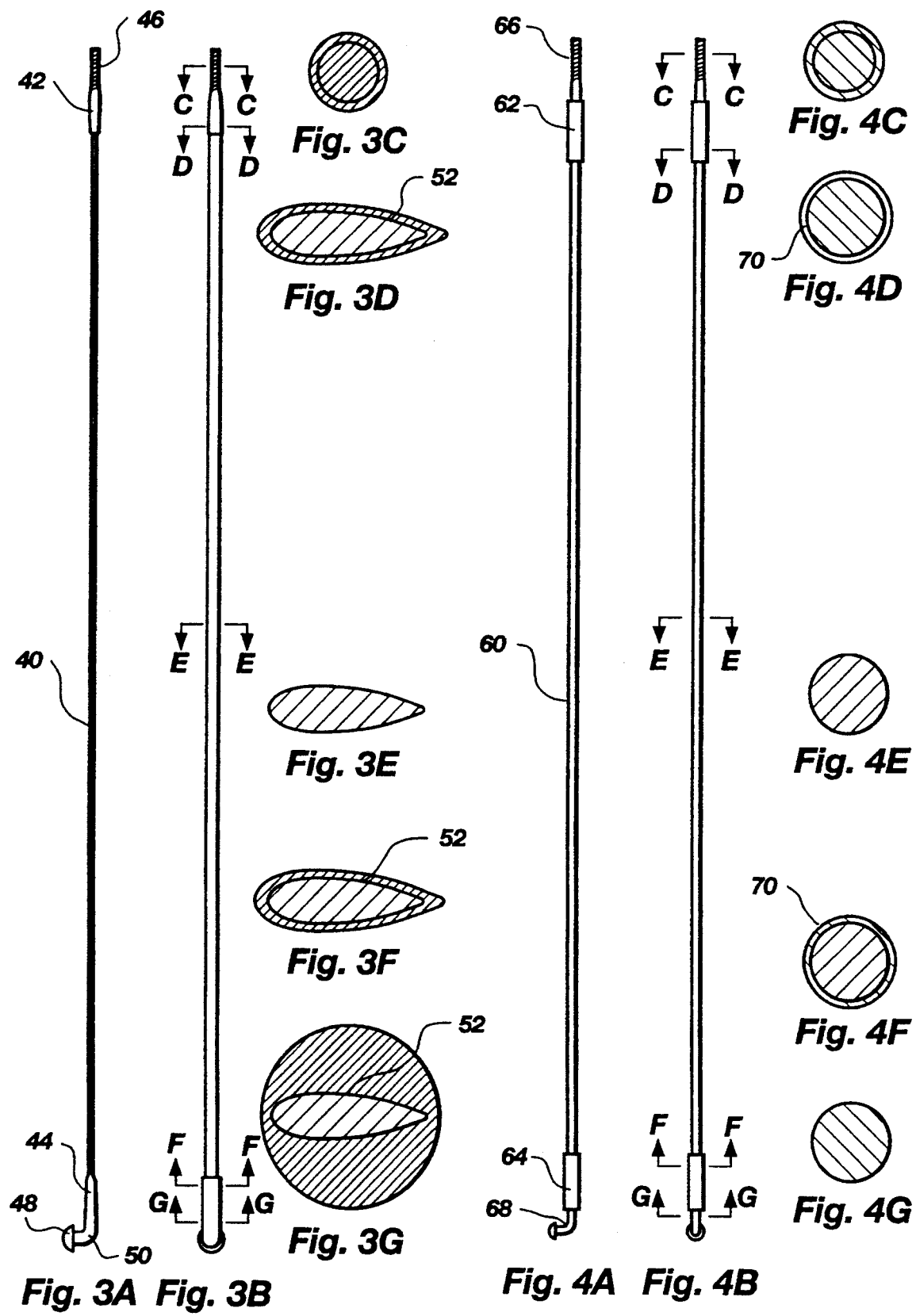

FIBER REINFORCED SPOKE FOR WHEELS OF BICYCLES, WHEELCHAIRS AND THE LIKE, AND METHOD OF MAKING SAME

BACKGROUND OF THE INVENTION

This is a continuation-in-part application of application Ser. No. 07/728,619, filed Jul. 11, 1991 now abandoned.

This invention relates to spokes for wheels such as are part of bicycles, wheelchairs, and the like, and more specifically to an improved fiber reinforced plastic spoke for such wheels, and methods of manufacturing same.

Conventional spoked wheels for bicycles, wheelchairs, and the like consist of a metal rim (which connects to a rubber tire), a metal hub (at the axis of wheel rotation), and tensioned metal spokes which connect the rim to the hub. A typical conventional spoke (as shown in FIG. 1 of the drawings) is circular in cross-section, has a threaded end which fits through a hole in the wheel rim and attaches to a metal nipple, and has a bent end which attaches through a hole in the wheel hub. However, variations on the circular cross-section of spokes exist such as, for example, a rectangular cross-section spoke known as a bladed spoke.

Another prior art spoked wheel is the one-piece molded spoked wheel generally made from fiber-reinforced plastic (FRP). This type of wheel is described in such patents as U.S. Pat. Nos. 4,793,659, 4,919,490, 4,930,843, and 4,930,844. Typically, a one-piece FRP molded wheel consists of three to five large aerodynamically shaped spokes integrally molded with a rim and a hub. The large integrally molded spokes act as non-tensioned rigid structural beams, rather than as tensioned suspension wires as do conventional metal spokes.

Still another prior art spoked wheel is a plain fiber spoked wheel typically having a wheel hub suspended at the center of a metal wheel rim by tensioned fiber yarns. The fiber yarns, typically made from materials such as aramid fibers, are "plain" in the sense that they are not protected by, or used as reinforcement in, plastic. Stated another way, the fibers are by themselves instead of being an integral part of a fiber reinforced plastic (FRP) composite material. In this configuration, the "spokes" can take tensile loads but cannot take bending, shear, or compression loads. Hence, the bent-end configuration of a conventional spoke (see FIG. 1) is not possible. Instead, a special wheel hub and/or a special wheel rim must be utilized to allow the plain yarns to be wrapped around attachment elements.

Bicycles, wheelchairs and other rider-powered vehicles better meet the needs of the rider when they are lighter in weight, have less wind drag, are more shock absorbent, and have components which are less costly to purchase and less costly to repair/replace. The need for reduced weight is evidenced by the successful marketing of thin-walled, high strength steel alloy frames, FRP frames, and light alloy metal wheel rims. The need for less wind drag (better aerodynamics) is evidenced by the successful marketing of aerodynamic helmets, sleek clothing, and aerodynamic FRP frame shapes. The need for improved shock absorption is evidenced by the successful marketing of gel saddles, hydraulic or pneumatic wheel shock absorbers, and cantilever FRP seat bars. The need (or desirability) for low cost in purchase and repairs is self evident.

The above-described prior art spoke technologies and spoked wheel technologies do not allow the owner of a vehicle with conventional spoked wheels to realize the advantages of FRP spoke materials (reduced weight, moldability to aerodynamic shapes, shock absorption) without replacing the entire conventional wheels (rims, hubs, spokes) at significant expense by purchasing one-piece FRP molded wheels and giving up the capability to inexpensively replace damaged spokes. The owner can realize part of the advantages of FRP spoke materials (reduced weight, shock absorption, but not moldability to aerodynamic shapes) by upgrading to plain fiber spokes, but in doing so must increase damage susceptibility and must replace the hub and/or rim at significant expense. Furthermore, the above-described prior art does not allow manufacturers of new bicycles to offer the advantages of FRP spoke materials in the wheels of their bicycles other than by offering one-piece FRP molded wheels or plain fiber spoked wheels with their above-described disadvantages over conventional spoked wheels.

SUMMARY OF THE INVENTION

It is a general object of the invention to provide spokes which have the advantages of FRP materials, in configurations that can be fit or retrofit into conventional rims and hubs.

It is another object of the invention to provide spokes made from fiber reinforced plastic in configurations that can be fit or retrofit into wheels originally made to accept conventional metal spokes.

It is a further object of the invention to provide processes for fabrication of these FRP spokes such that the cross-sectional shape can be varied to be circular, aerodynamic (for example, an airfoil shape), or other shape, such that the orientation of the majority of the fibers is generally in the direction of the main axis of the spoke, thus enhancing the strength-to-weight and stiffness-to-weight ratios of the spoke, and such that the manufacturing cost per wheel-set of spokes can be substantially less than the cost of heretofore known prior art one-piece FRP molded wheels and plain fiber spoked wheels.

It is a further object of the invention to provide such FRP spokes in which various spoke lengths may be achieved with a single size central spoke body.

The above and other objects of the invention are realized in a specific illustrative embodiment of a spoke which includes an injection molded discontinuous fiber reinforced plastic shaft having first and second rims, and formed to have a cross-sectional shape such that when installed in a wheel, the dimension transverse to the directional forward motion of the wheel is the less than the dimension aligned with its forward motion. The first end of the shaft is molded to define a longitudinally extending threaded first hollow for receiving a correspondingly threaded rod, and a second end is molded to define a longitudinally extending second hollow. Also included is an elongate hub element formed with a bend at one end, and threaded at the other end for screwing of the other end into the first hollow of the shaft. An elongate bar is provided for insertion and securing at one end into the second hollow of the shaft, with threads being formed at the other end of the bar for coupling, for example, to a wheel rim. Bend in the hub element allows for coupling, for example, to a wheel hub.

In accordance with one aspect of the invention, the second end of the shaft is molded about the one end of the bar which is knurled to better hold in the second hollow of the shaft.

In accordance with another aspect of the invention, a plurality of shafts, all the same length, may be provided, with overall spoke lengths being selectively variable by providing different length hub elements or different length bars, or both, as desired.

BRIEF DESCRIPTION OF THE DRAWINGS

The above and other objects, features and advantages of the invention will become apparent from a consideration of the following detailed presented in connection with the accompanying drawings in which:

FIG. 1A is a spoke of the prior art;

FIG. 1B is a side view of the spoke of FIG. 1A;

FIG. 1C is a cross-sectional view of the spoke of FIG. 1B taken along lines C—C;

FIG. 2A is a front view of a spoke made in accordance with the principles of the present invention;

FIG. 2B is a side view of the spoke of FIG. 2A;

FIG. 2C is a cross-sectional view of the spoke of FIG. 2B taken along lines C—C;

FIG. 2D is a cross-sectional view of the spoke of FIG. 2A taken along lines D—D;

FIG. 2E is a cross-sectional view of the spoke of FIG. 2B taken along lines E—E;

FIG. 3A is a front view of another embodiment of the spoke of the present invention;

FIG. 3B is a side view of the spoke of FIG. 3A;

FIG. 3C is a cross-sectional view of the spoke of FIG. 3B taken along lines C—C;

FIG. 3D is a cross-sectional view of the spoke of FIG. 3B taken along lines D—D;

FIG. 3E is a cross-sectional view of the spoke of FIG. 3B taken along lines E—E;

FIG. 3F is a cross-sectional view of the spoke of FIG. 3B taken along lines F—F;

FIG. 3G is a cross-sectional view of the spoke of FIG. 3B taken along lines G—G;

FIG. 4A is a front view of still another embodiment of the spoke of the present invention;

FIG. 4B is a side view of the spoke of FIG. 4A;

FIG. 4C is a cross-sectional view of the spoke of FIG. 4B taken along lines C—C;

FIG. 4D is a cross-sectional view of the spoke of FIG. 4B taken along lines D—D;

FIG. 4E is a cross-sectional view of the spoke of FIG. 4B taken along lines E—E;

FIG. 4F is a cross-sectional view of the spoke of FIG. 4B taken along lines F—F;

FIG. 4G is a cross-sectional view of the spoke of FIG. 4B taken along lines G—G;

DETAILED DESCRIPTION

Figures 5A, 5B:
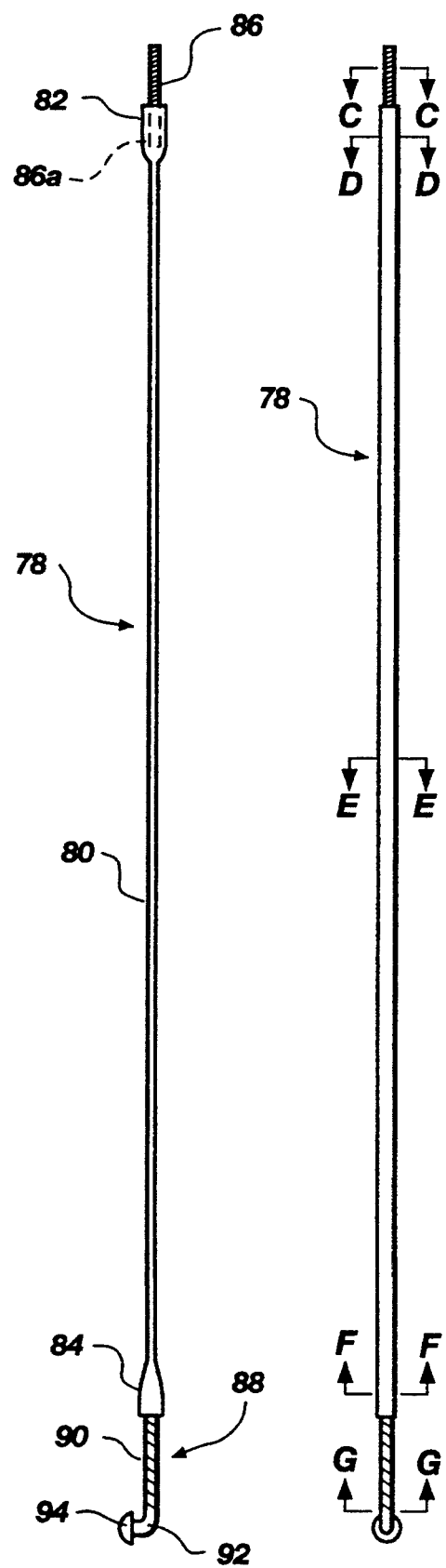
FIG. 5A is a front view of a further embodiment of the spoke.
FIG. 5B is a side view of the spoke of FIG. 5A.
Figure 5C:
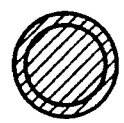
FIG. 5C is a cross-sectional view of the spoke of FIG. 5B taken along lines C—C.
Figure 5D:
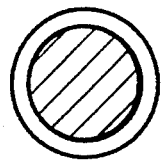
FIG. 5D is a cross-sectional view of the spoke of FIG. 5B taken along lines D—D.

FIG. 1 illustrates a typical prior art conventional metal spoke, showing a front view (FIG. 1A), a side view (FIG. 1B) and a cross-sectional view (FIG. 1C) taken along lines C—C of FIG. 1B.

Referring now to the various views of FIG. 2, there is shown an injection molded fiber reinforced plastic (FRP) spoke 18. The spoke includes a threaded end 20 which fits through a hole in a conventional wheel rim and attaches to a conventional metal nipple to secure the threaded end to the wheel rim. In an upper transitional area 22, the spoke 18 gradually changes from a circular cross-sectional shape (FIG. 2C) to a center section 24 having an aerodynamic cross-sectional shape (FIG. 2D of a symmetrical airfoil or teardrop, tapered to a point. The center section 24 maintains the airfoil cross-sectional shape from the upper transitional area 22 to a lower transitional area 26, where the cross-sectional shape gradually changes to a circular shape (FIG. 2E). A bend 28 is formed in the lower end of the spoke 18 which attaches through a hole in a conventional wheel hub. A nub 30, which is an enlargement of the cross-sectional area of the bend 28, is formed at the end of the bend to prevent the lower end of the spoke from pulling out of the hole in the wheel hub to which it is attached.

The spoke 18 of FIGS. 2 is a one-piece construction of a single material, with no joints or bonds. Advantageously, the spoke 18 is constructed of a composite of short or medium length fibers evenly disbursed and aligned in a plastic resin matrix material. The fiber may be any type suitable for reinforcement of plastics, including carbon, aramid, glass, polyethylene, silica ceramic or boron. The plastic resin matrix material may be any type suitable for use with FRP, including thermoplastic such as polyamide, polycarbonate, PET polyester, polyphenylene sulfide, or thermosets such as vinylesters, epoxies, polyesters, bismaleimides phenolics. To facilitate rapid injection molding processes, thermal plastics are generally preferred for the FIGS. 2 embodiment over thermosets.

The alignment of the short or medium length fibers (typically less than 1.2 cm. in average length) is accomplished using injection molding, a well-known process in the plastics and FRP fields. In the process of injection molding generally, the fibers and plastic resin are mixed and then heated until the resin melts, and then injected under pressure into a closed mold. Upon cooling below the melting point of the resin, the mold is opened and the part is ejected. To optimize the alignment of fibers in the manufacture of spoke 18, the injection port in the mold used should be located at the threaded end 20, and only one vent in the mold should exist, and that vent should be located in the mold coincident to a nub end 32 of the nub 30. The vent should have a cross-sectional area of less than fifteen percent of the cross-sectional area of the center section 24 of the spoke. Then, when the FRP materials are injected into the mold, the fibers will generally align themselves in the direction of flow of the materials. Thus, with the injection port and vent locations described above, the fibers in the center section 24 of the spoke will be aligned generally along the length thereof, enhancing the strength-to-weight and stiffness-to-weight ratios.

When the flow of FRP materials reaches the area of the mold corresponding to the nub 30, the materials will meet a resistance to flow caused by the small vent cross-sectional area. This, combined with a sudden enlargement of cross-sectional area at the nub 30, will cause some turbulence in the flow and this, in turn, will cause the fibers to be randomly oriented in the nub 30 and to some extent in the bend area 28. This random orientation will result in a more isotropic strength than in the center section 24.

During the time the FRP materials are flowing past the area of the mold corresponding to the threaded end 20, the materials are not being forced into the threaded end portion of the mold because the resistance to flow down the spoke center section 24 is less than the resistance to filling the threads. However, when the flow meets the resistance at the nub area 30, the overall mold cavity pressure increases, causing the materials to be forced into the mold threads. Advantageously, in the injection molding process of interest here, the pressure will reach a minimum of about 5,000 psi and when such pressure is reached, the flow of materials will have essentially stopped and the fibers will be of generally random orientation in the threaded area of the mold, some being forced to lie along the thread routes and some being forced to bend around the thread lands. This randomization, in combination with the fiber conformance to the thread shape, provides enhanced thread shear strength when the spoke is in use. In the above-described injection molding process, after the spoke is cooled and ejected from the mold, the flash and sprue are removed and the spoke is ready for installation into the rim and hub of a conventional wheel used for bicycles, wheelchairs, and the like.

FIGS. 3A–3G show various views of another embodiment of a spoke 38 of the present invention. In this embodiment, the spoke 38 includes a pultruded FRP center section 40, and an injection molded FRP rim end cap 42, and an injection molded FRP hub end cap 44. The rim end cap 42 and hub end cap 44 are molded to include cavities to receive and adhesively bond to respective ends of the spoke center section 40; these cavities have substantially the same cross-sectional shape as the spoke center section 40 but with a slightly larger dimension to allow space for a suitable adhesive 52 (FIGS. 3D, 3F and 3G). The rim end cap 42 and hub end cap 44 may be made of the same type of materials as those described for the FIG. 2 embodiment.

The spoke center section 40, as earlier indicated, is constructed using the pultrusion process by pulling fiber and resin through a heated forming die. The pultrusion process is well-known to those skilled in the art of fabrication of FRP structural materials. Advantageously, the fiber utilized is continuous along the entire length of the spoke center section 40 to provide a high strength and stiffness for the section. By reason of the nature of the pultrusion process, the fibers are aligned in the direction of the axis of pulling through the die which is also the axis of the spoke. This direction of alignment is optimum for both strength- and stiffness-to-weight ratios. The fibers and resins which may be used in constructing the spoke center section 40 are the same as those described for the FIG. 2 embodiment.

FIG. 4 shows another embodiment of a spoke 58 made in accordance with the present invention to include a pultruded FRP center section 60, a rim collar 62 adhesively bonded over the upper end of the center section 60, a threaded rim metal end 66 bonded into the upper end of the rim collar 62 so that the threads are exposed, a hub collar 64 bonded over the lower end of the center section 60 and a hub metal end 88 adhesively bonded in the lower end of the hub collar 64. The metal ends 66 and 88 may be made of the same materials of conventional metal spokes. The collars 62 and 64 may be made of any suitable high strength structural material such as steel or titanium.

The inner diameters of the collars 62 and 64 are slightly larger than the outer diameters of the components to be bonded therein (ends of spoke center section 60 and metal ends 66 and 88) so as to allow space for an adhesive 70 (FIGS. 4D and 4F). The length of the collar 62 and 64 should be as short as possible but yet sufficient to provide an adhesive bond so as to safely transmit spoke tensile loads, via shear loading, from the spoke center section 60 to the metal ends 66 and 88. The collar 62 and 64 may be fabricated using any of a variety of tubing fabrication methods well-known in the art such as extrusion or drawing for metals, table rolling or filament winding for FRP, etc. The spoke center section 60 is pultruded in the same manner as described for the center section 40 of FIG. 3. The spoke center section 40 is shown to have a circular cross-section to match the circular cross-sections of collars 62 and 64 and the circular cross-sections of metal ends 66 and 88. However, the cross-sectional shape of the spoke center section 60 may be selected to be an aerodynamic airfoil shape, as shown for the FIG. 2 and FIG. 3 embodiments.

FIGS. 5A–5G show still another embodiment of a spoke 78 made in accordance with the present invention to include an injection molded FRP center section 80 formed with an enlarged upper end 82 having an axially extending bore or hollow, and an enlarged lower end 84 having an axially extending, threaded bore or hollow. The spoke 78 also includes a threaded rim metal end 86 for insertion and adhesively bonding into the hollow of the enlarged end 82 of the center section 80 such that the threads of the rim metal end are exposed. Finally, the spoke 78 also includes a hub metal end 88 having a threaded shank portion 90 for screwing into the threaded hollow of the enlarged end 84 of the center section 80, a bend portion 92 and a nub 94, of conventional design.

Figure 5E:
FIG. 5E is a cross-sectional view of the spoke of FIG. 5B taken along lines E—E.
Figure 5F:
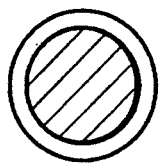
FIG. 5F is a cross-sectional view of the spoke of FIG. 5B taken along lines F—F.
Figure 5G:
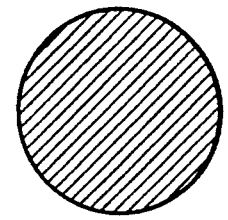
FIG. 5G is a cross-sectional view of the spoke of FIG. 5B taken along lines G—G.

The center section 80, except for the enlarged ends 82 and 84, is formed to have an aerodynamic airfoil shape as shown in FIG. 5E. The center section 80 is constructed by injection molding a composite of discontinuous short or medium length fibers aligned in a plastic resin matrix material, such as described for the embodiment of FIG. 2. The material used and molding process may be the same as that described for the FIG. 2 embodiment.

With the configuration of FIGS. 5A–5G, the center section 80 may be manufactured to be of one standard length but then, if different overall spoke lengths are desired, the length of the rim metal ends 86 and hub metal ends 88 may be manufactured in different sizes to achieve the desired overall spoke length. In other words, various overall length spokes may be manufactured using a single length spoke body or center section 80.

The end of the rim metal end 86 inserted into the hollow of the enlarged end 82 of the center section 80 may be knurled as shown in phantom at 86a, roughened or formed with threads to better adhesively hold it in place in the hollow.

With the embodiments described above of the spoke of the present invention, a number of advantages are apparent including the reduction of wind drag on the spokes by forming the spoke center sections in an aerodynamically airfoil cross-sectional shape, the reduction of overall weight of the vehicle in which the wheel is mounted because of the use of low density FRP materials, and the improvement of shock absorbing characteristics because of the inherent shock absorbing ability of the FRP materials.

The spokes of the present invention would be installed between a wheel hub and wheel rim in the same manner as would a conventional metal spoke. The holes in the hub and in the rim which accommodate spokes may have to be formed slightly larger than with conventional spokes to accommodate the variety of cross-sectional shapes described for the various embodiments of the present invention. This, however, would be a straightforward modification.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A one-piece integral spoke for use in wheels of bicycles, wheelchairs and the like, comprising
   an injection molded discontinuous fiber reinforced plastic shaft formed to have a cross-sectional symmetrical airfoil shape positioned such that when installed in a wheel, the dimension transverse to the direction of forward motion of the wheel is less than the dimension aligned with such forward motion, wherein the discontinuous fibers are generally aligned with one another along the length of the spoke,
   a threaded end section integrally formed on one end of the shaft, of discontinuous fiber reinforced plastic, for connecting to a wheel rim, the cross-sectional shape of the threaded end section being generally circular, and
   a hub end section integrally formed on the other end of the shaft, of discontinuous fiber reinforced plastic, having a generally circular cross-sectional shape, and being formed with a bend for connecting to a wheel hub.

2. The spoke of claim 1 wherein said discontinuous fibers are carbon fibers.

3. The spoke of claim 1 wherein said plastic is from the polyamide family.

4. The spoke of claim 1 wherein said plastic is from the polycarbonate family.

5. The spoke of claim 1 wherein the discontinuous fibers are generally aligned with one another along the length of the spoke.

6. The spoke of claim 1 wherein the shaft has an airfoil cross-sectional shape.

7. A fiber reinforced plastic spoke for use in wheels of bicycles, wheelchairs and the like, comprising
   a pultruded continuous fiber reinforced plastic shaft formed to have a cross-sectional teardrop shape positioned such that when installed in a wheel, the dimension transverse to the direction of forward motion of the wheel is less than the dimension aligned with such forward motion,
   an injection molded discontinuous fiber reinforced plastic rim end cap having a receptacle for receiving one end of the shaft and having exterior threads for connecting to a wheel rim, and
   an injection molded discontinuous fiber reinforced plastic hub end cap having a receptacle for receiving the other end of the shaft, and having a bend formed therein for connecting to a wheel hub.

8. The spoke of claim 7 wherein said continuous fibers are carbon fibers.

9. The spoke of claim 7 wherein said plastic is from the vinylester family.

10. The spoke of claim 7 wherein said plastic is from the polyester family.

11. The spoke of claim 7 wherein said plastic is from the polyamide family.

12. The spoke of claim 7 wherein the shaft has an airfoil cross-section.

13. A spoke for use in wheels of bicycles, wheelchairs and the like, comprising
    an injection molded discontinuous fiber reinforced plastic shaft having a first end and second end, and formed to have a symmetrical airfoil cross-sectional shape such that when installed in a wheel, the dimension transverse to the direction of forward motion of the wheel is less than the dimension aligned with such forward motion, said first end being molded to define a longitudinally extending threaded first hollow for receiving a correspondingly threaded rod, said second end being molded to define a longitudinally extending second hollow, wherein the discontinuous fibers are generally aligned with one another along the length of the shaft.
    an elongate hub element being formed with a bend at one end, and threads at the other end for allowing the screwing of said other end into the first hollow of the shaft, and
    and elongate bar for insertion and securing at one end into the second hollow of the shaft, and being formed with threads at the other end.

14. A spoke as in claim 13 wherein said one end of the bar is knurled.

15. A spoke as in claim 14 wherein said second end of the shaft is molded about said one end of the bar.

16. A spoke as in claim 13 wherein said hub element and said elongate bar are made of metal.

17. A spoke as in claim 13 wherein said second hollow is formed with threads, and wherein said one end of the bar is formed with threads to allow screwing into the second hollow.

18. A spoke as in claim 13 wherein the shaft has an airfoil cross-sectional shape.

19. A spoke as in claim 13 wherein the discontinuous fibers are generally aligned with one another along the length of the shaft.

20. A method of joining a wheel hub to a wheel rim with spokes of selectable lengths comprising
    providing a plurality of spokes, each having
    an injection molded discontinuous fiber reinforced plastic shaft of one predetermined length, with first and second axially disposed bores formed in first and second ends respectively of the shaft, said shaft having a symmetrical airfoil cross-sectional shape, wherein the discontinuous fibers are generally aligned with one another along the length of the shaft.
    an elongate hub element formed with a bend at one end, said other end for securing in the first bore in the first end of the shaft, and
    an elongate bar for securing at one end in the second bore of the second end of the shaft, the other end of the bar being formed with threads, and
    wherein at least the hub elements or bars are provided in various different lengths to enable selecting and providing various different overall spoke lengths utilizing shafts of a single length.

* * * * *